3,475,941
TUBE EXTRUSION PRESSES WITH A
RETRACTABLE DIE CARRIER
Horst Hans Groos, Metzkausen, Friedrich Niggemeier, Buttgen, and Heinz Stapel, Dusseldorf, Germany, assignors to Schloemann Aktiengesellschaft, Dusseldorf, Germany, a German company
Filed Aug. 15, 1966, Ser. No. 572,392
Int. Cl. B21c 23/00
U.S. Cl. 72—257      3 Claims

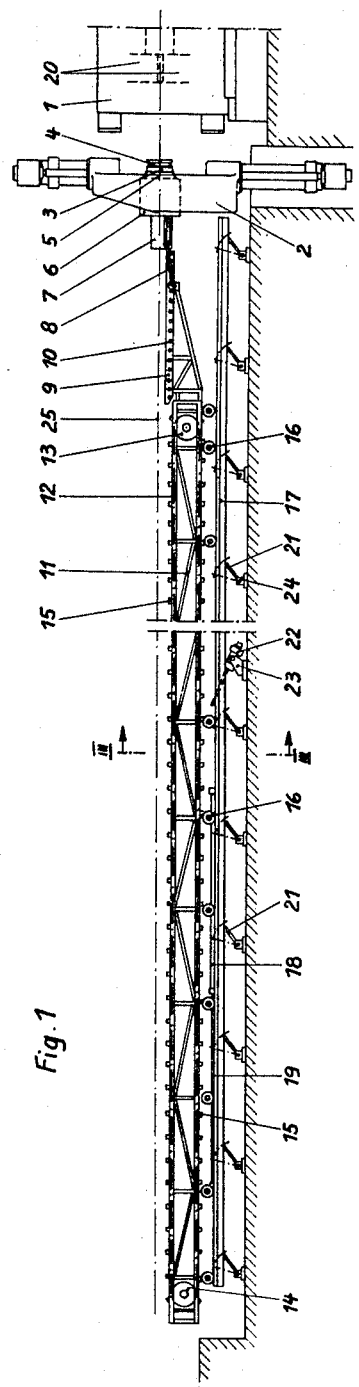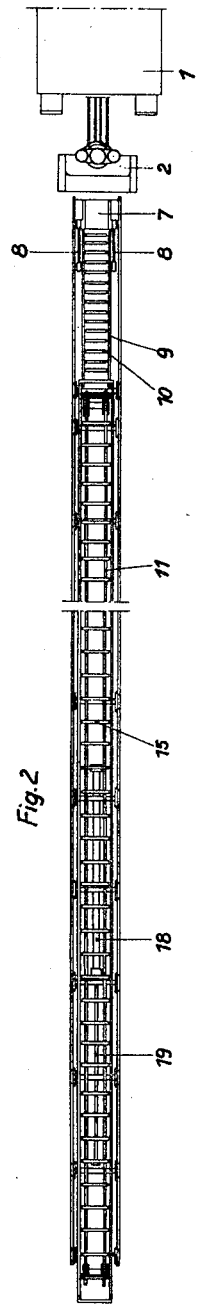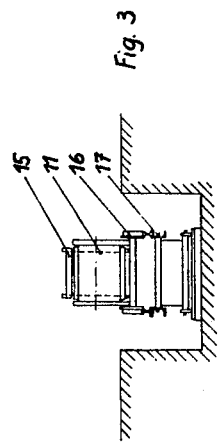

ABSTRACT OF THE DISCLOSURE

A horizontal extrusion and tube press with a retractable die carrier in which the press outlet system, preferably constituted by an apron conveyor, is coupled to the die carrier, the means driving the outlet conveyor also driving the die holder so that these constitute a single driven unit. A roller conveyor with driven rollers may preferably be located between the die carrier and the apron conveyor.

---

The present invention relates to tube extrusion presses with a retractable die carrier.

In extrusion presses with a retractable die carrier the extrusion process is followed by the retraction of the die holder, together with the die and the unextruded material and dummy block adhering thereto, along the axis of the press and out of the container to a shearing device where the dummy block and discard end are severed from the die. The die holder and die are then returned to extruding position. The extrusion is still present in the die during this process and is only ejected therefrom during the subsequent extrusion process when the next extrusion forces it out of the die aperture. The extruded material must therefore be conveyed back to the container after discard and dummy block have been removed from the die. During this movement it rubs against the press outlet and the surface is damaged. The aim of the invention is to obviate this damage, particularly in the case of light metal sections, while reducing the means required for this purpose to minimum dimensions.

According to this invention this is achieved in that the press outlet system is coupled to the die carrier, the means driving the outlet conveyor also driving the die holder. The outlet conveyor and die carrier thus constitute a single driven unit, and the die carrier is thus part of the outlet system. The outlet system is preferably constituted by a chain or slat conveyor, the surfaces of which are rails of adjustable height. Thus, when the chain or slat conveyor moves synchronously with the speed of extrusion there is no relative movement between press outlet and extrusion, thereby practically excluding any risk of damage to the surface of the extrusion during ejection. Moreover, the fact that the height of the surfaces of the chain or slat conveyor may be adjusted to match that of the extrusion to be ejected means that the chain or slat conveyor is able to receive the extrusion without its being bent.

In a further embodiment of the invention, a roller conveyor with driven rollers is located between the die carrier and the chain or slat conveyor. The use of a roller conveyor to bridge the space between the chain or slat conveyor and the die carrier has the particular advantage of enabling the costs involved in the construction of the press outlet mechanism to be substantially reduced. This is, in particular, due to the fact that when the chain or slat conveyor moves back towards the press, it is necessary to bridge the distance between the saw and the working position of the die in the container, and the press outlet conveyor has to pass through the saw. For reasons of space, the platform could only be advanced towards the container if the saw and the container could be adjusted to the dimensions of the chain or slat conveyor. When a roller conveyor is located between the apron and the die carrier, there is no need to alter the dimension of these parts of the machine to match those of the chain or slat conveyor, since the distance between the shearing device and the container is bridged by the very narrow, space-saving roller conveyor arrangement. The fact that the rollers are also driven means that short extruded members may also safely be conveyed on to the chain or slat conveyor. The drive for the chain or slat conveyor is preferably made adjustable so that it can be set to work synchronously with the extrusion press at various speeds. It has also proved advantageous to provide the drive for the chain or slat conveyor with a rapid return, thus enabling an extrusion to be removed without affecting the subsequent extrusion.

The invention will now be described with reference to the accompanying drawing, which shows an embodiment of the invention, but in no restrictive sense. In the drawing:

FIGURE 1 is a side view, and
FIGURE 2 a plan view of the press outlet mechanism with the shearing device and container in a tube extrusion press with a retractable die carrier, and
FIGURE 3 is a section along the line III—III of FIGURE 1.

In the figures, 1 is the container in a tube extrusion press not shown in greater detail; 2 is the saw which follows the container 1 and severs the discard 3 and the dummy block 4 from the ejected extrusion or from the die 5 which is secured to the die holder 6. Coupling members 8 are articulated on either side of the outlet portion 7 of the die holder 6 and pivotally connect the roller conveyor 9 with driven rollers 10 to the die holder 6. The roller table 9 is rigidly attached to the frame 11 of the chain or slat conveyor 12. The conveyor 12 is driven by means of the two reversing rollers 13 and 14 and is provided with cross-pieces 15 which provide a surface on which the ejected extrusion rests. The frame 11 is provided with wheels 16 which run on rails 17 and thus enable the conveyor 12 to be displaced in a longitudinal direction. This longitudinal displacement of the conveyor 12 is effected by means of the hydraulic cylinder 18 which is secured to the rails 17, while its piston rod 19 engages on the frame 11 of the conveyor 12. When the hydraulic cylinder 18 is actuated, and with the position of the conveyor 12 as shown in the drawing, the latter is moved towards the container 1 together with the die holder 6 articulated to the roller conveyor 9. As soon as the die holder 6 is in working position in the container 1, it is supported by the wedges 20 in the said container 1. The rails 17 are articulated to the linkages 21 and their height may be adjusted by means of the power unit 22 which acts on the rails 17. The power unit 22 is mounted in a bearing block 23 and the linkages 21 are located in bearing blocks 24 which are secured to the base. The die holder 6 moves on guides not shown in the drawing so that whatever the height of the conveyor 12, it is always in alignment with the axis 25 of the press.

We claim:
1. A horizontal extrusion and tube press with a die carrier movable in the press axis and with a run-out system displaceable in the press axis, said die carrier and run-out system being interconnected and having a common drive, said run-out system consisting of an endlessly circulating chain or slat conveyor and a roller table rigidly connected with the conveyor frame and arranged between the die carrier and the conveyor, said conveyor frame having wheels on its underside and being movable together with the roller run-out and the die carrier by means of said wheels on rails along the press axis, said rails serving as a support surface of the conveyor frame being arranged on rod linkages mounted in bearing brackets on the foundation and being adjustable for height by means of a power device engaging the rails.

2. A horizontal extrusion and tube press with press run-out displaceable along the press axis as claimed in claim 1, wherein the rollers of the roller table are drivable independently of the conveyor drive, controllably synchronous with the prevailing rate of extrusion.

3. A horizontal extrusion and tube press with press run-out movable in the press axis as claimed in claim 1, wherein the drive of the chain or slat conveyor can be driven controllably synchronous with the prevailing rate of extrusion and the drive provided with an additional rapid return mechanism for accelerated removal of the extruded material.

References Cited

UNITED STATES PATENTS

| | | | |
|---|---|---|---|
| 1,393,580 | 10/1921 | Schranz | 72—257 |
| 2,379,622 | 7/1945 | Butler | 72—257 |
| 2,830,700 | 4/1958 | Kamena | 72—257 |
| 2,914,170 | 11/1959 | Kent | 72—257 |
| 3,157,268 | 11/1964 | Anderson | 72—257 |

CHARLES W. LANHAM, Primary Examiner

LOWELL A. LARSON, Assistant Examiner

U.S. Cl. X.R.

72—255